United States Patent [19]
Wesley

[11] 3,740,565
[45] June 19, 1973

[54] AIR DRIVEN MODULAR TANDEM ELECTRICAL GENERATOR

[75] Inventor: Neil G. Wesley, Canoga Park, Calif.

[73] Assignee: Beatrice N. Adams, Canoga Park, Calif.

[22] Filed: Apr. 26, 1971

[21] Appl. No.: 118,942

[52] U.S. Cl. .................. 290/55, 290/44, 310/112, 310/67
[51] Int. Cl. ............................................. F03d 9/00
[58] Field of Search .................. 240/52, 53, 54, 55, 240/42, 43, 44; 415/500, 110, 111, 112; 416/356, 420; 310/168, 66, 67, 112

[56] References Cited
UNITED STATES PATENTS

| | | | |
|---|---|---|---|
| 3,644,053 | 2/1972 | Braikevitch | 415/112 |
| 1,783,669 | 12/1930 | Oliver | 290/44 X |
| 2,743,375 | 4/1956 | Parker | 290/52 |
| 2,436,683 | 2/1948 | Wood | 290/54 X |
| 3,339,078 | 8/1967 | Crompton | 290/54 X |
| 2,031,968 | 2/1936 | Mathias | 290/52 |
| 3,444,946 | 5/1969 | Waterbury | 290/54 X |
| 3,513,326 | 5/1970 | Potts | 290/55 |
| 3,556,239 | 1/1971 | Spahn | 290/55 |

Primary Examiner—G. R. Simmons
Attorney—Victor Sepulveda

[57] ABSTRACT

Herein described is an air driven generator for providing electrical energy for charging storage batteries. A plurality of rotors including a round rim, a hub and connecting vanes are alternately interdisposed upon a fixed shaft between a plurality of corresponding hollow stators. A segmented permanent magnet is mounted around the periphery of the rim of each rotor and creates a moving magnetic field. A corresponding stationary armature is positioned on stators adjacent to a corresponding rotor and suspended around and over the corresponding rotor.

2 Claims, 6 Drawing Figures

Patented June 19, 1973

INVENTOR.
NEIL G. WESLEY
BY Victor Sepulveda
ATTORNEY

Patented June 19, 1973

INVENTOR.
NEIL G. WESLEY
BY
ATTORNEY

AIR DRIVEN MODULAR TANDEM ELECTRICAL GENERATOR

BACKGROUND OF THE INVENTION

Field of the Invention

This invention relates to electrical generators and more particularly to a novel and improved air driven, tandem mounted, modular electrical generator or generators useful for generating electrical energy from an outside velocity of air for recharging the batteries.

Due to friction caused by the moving parts of the impellers and shafts or whatever mechanical apparatus is used, a large power loss is incured between the fan or impeller and the generator. Also because of the large size of these air generators, a large resistance to the air is built up to virtually provide only a 50 percent increase in the power ratio.

Therefore, it would become desirous to provide a device which has the feature of being able to generate electric current from air flow to recharge the batteries. Further, such a device should be one which has less friction due to mechanical losses in the generating system, so that the air flow used is more effective.

SUMMARY OF THE INVENTION

The present invention as described in the following embodiment overcomes all of the difficulties of the prior art system and has all of the features of the desirable system set forth above.

Briefly described, the present invention includes a stationary shaft mounted in the vehicle horizontal to the plane of direction of the vehicle. A plurality of stator elements are then fixedly mounted to the shaft. A plurality of rotor elements are rotatably mounted to the shaft and alternately interdisposed between alternate stator elements. Each rotor has a segmented permanent magnet mounted around the periphery of the rotor and is provided for each magnetic field on each rotor and is mounted to adjacent stators over each rotor.

Each rotor is mounted to rotate independent of the other rotors by the air stream of the moving vehicle. The stators are supported to the shaft by being supported by relatively thin, yet strong, webs between a rim and a hub. The hub is fixedly mounted to the shaft by a suitable set screw.

In one embodiment, it may be desirable to mount as many rotor generators on a single shaft to generate sufficient electrical energy for recharging the batteries. Also extra such generating units may be provided to further increase the output energy. To assure a constant charging rate, each generator may be coupled through a rectifier (full or halfwave) to a voltage regulator before being applied to the batteries.

DESCRIPTION OF THE DRAWINGS

These and other features and advantages will become more apparent to those skilled in the art when taken into consideration with the following detailed description wherein like reference numerals indicate like and corresponding parts throughout the several views and wherein.

DESCRIPTION OF ONE PREFERRED EMBODIMENT

Figure 1:
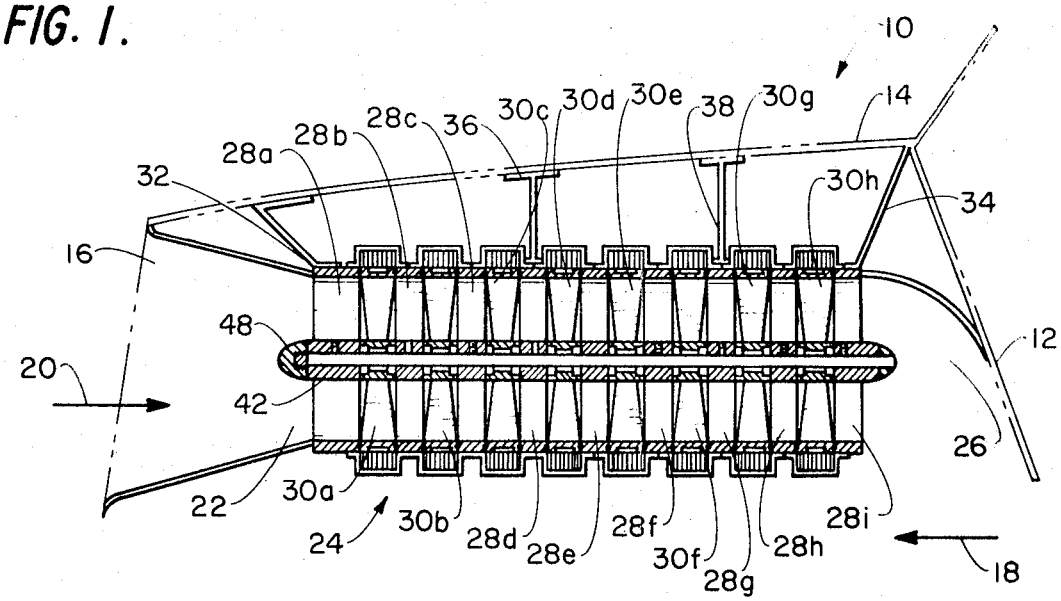
FIG. 1 is a side section view taken along the lines 1—1 of FIG. 2 which illustrates the tandem mounted rotors and stators of the generator used in accordance with the principles of this invention.
Figure 2:
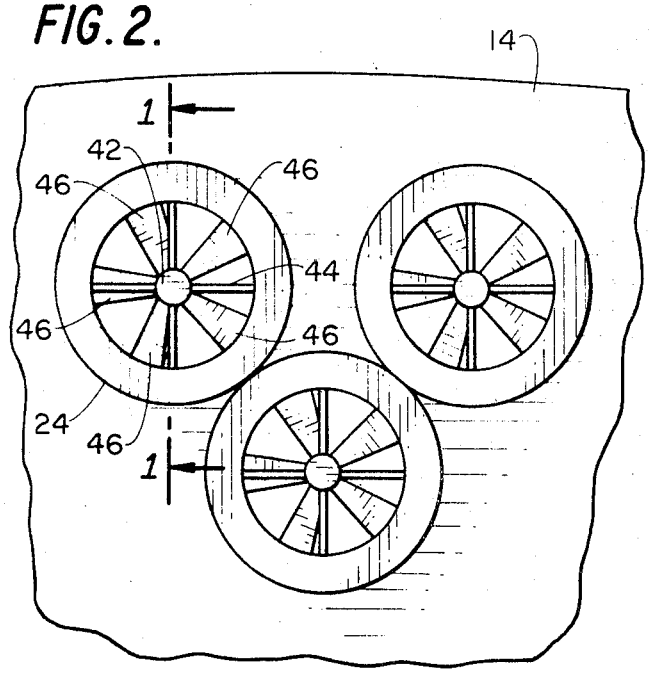
FIG. 2 illustrates three of the generators set forth in FIG. 1 mounted in a single vehicle.

Turning now to a more detailed description of this invention, there is shown in FIG. 1, a motor vehicle 10 which is illustrated in this embodiment as an automobile. It should be understood, though, that the principles of this invention are also applicable to airplanes, boats or other moving vehicles or it can be used independently as a generator in any source of wind or air supply. The motor vehicle in this embodiment is shown including a firewall 12 and a hood portion 14. The front of the vehicle 10 includes an air scoop inlet 16. An air flow can be caused to enter the air scoop 16 in the direction of the arrow 20 in a suitable manner.

On the inside portion 22 of the air scoop 16 there is positioned an electrical generator 24 constructed in accordance with the principles of one embodiment of this invention. The electrical generator 24 is constructed in a substantially hollow arrangement whereby the air inlet from the scoop 16 passes through the entire generator and leaves via a duct 26 where it exhausts into the atmosphere. An advantage in such an arrangement, is that the generator is cooled by its own power source.

The electrical generator 24 is comprised of a plurality of stator elements 28a – 28i. Alternately interdisposed between adjacent stator elements are corresponding rotor elements 30a – 30h with a stator element at both the air entrance area 22 and the exit area 23. An initial entry stator 28a is mounted, in a suitable manner, to the structure of the vehicle 10 and as shown in FIG. 1 by a bracket 32 being bolted to the stator 28a and to the hood portion 14. The exit stator 28i is mounted to the firewall 12 of the vehicle 10 by the bracket 34 in a suitable manner. Stator 28d is mounted to the hood portion 14 by the bracket 36 and stator portion 28g is mounted to the hood portion 14 by the bracket 38.

Figure 3:
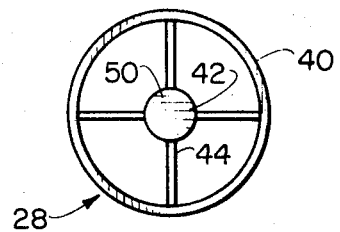
FIG. 3 is a frontal view of a stator of the generator in accordance with the principles of this invention.

Each of the stator portions 28 are comprised of cylindrical rims 40 which are connected to a hollow shaft 42 by relatively thin evenly spaced webs 44, as shown in FIG. 3. Each of the stator portions are firmly affixed to the shaft 42 by a suitable set screw, best shown for example, in FIG. 4 and will be described therein in detail in connection with that drawing.

Alternately disposed between the stators 28 are rotatable rotors 30, each rotor includes a vane 46 which has a pitch thereon causing the rotors 30 to rotate as the air is passed through the generator 24. Each rotor 30 is rotatably mounted on the shaft 42 by suitable bearings, each being independent of the movement of other rotors, as will be described in connection with FIG. 5.

As shown in FIG. 1, the shaft 42 is secured to the rotors 28 by suitable nuts 48. These nuts 48 are shown in a conical shape whereby they are streamlined to reduce the friction to air flow therearound.

Figure 4:
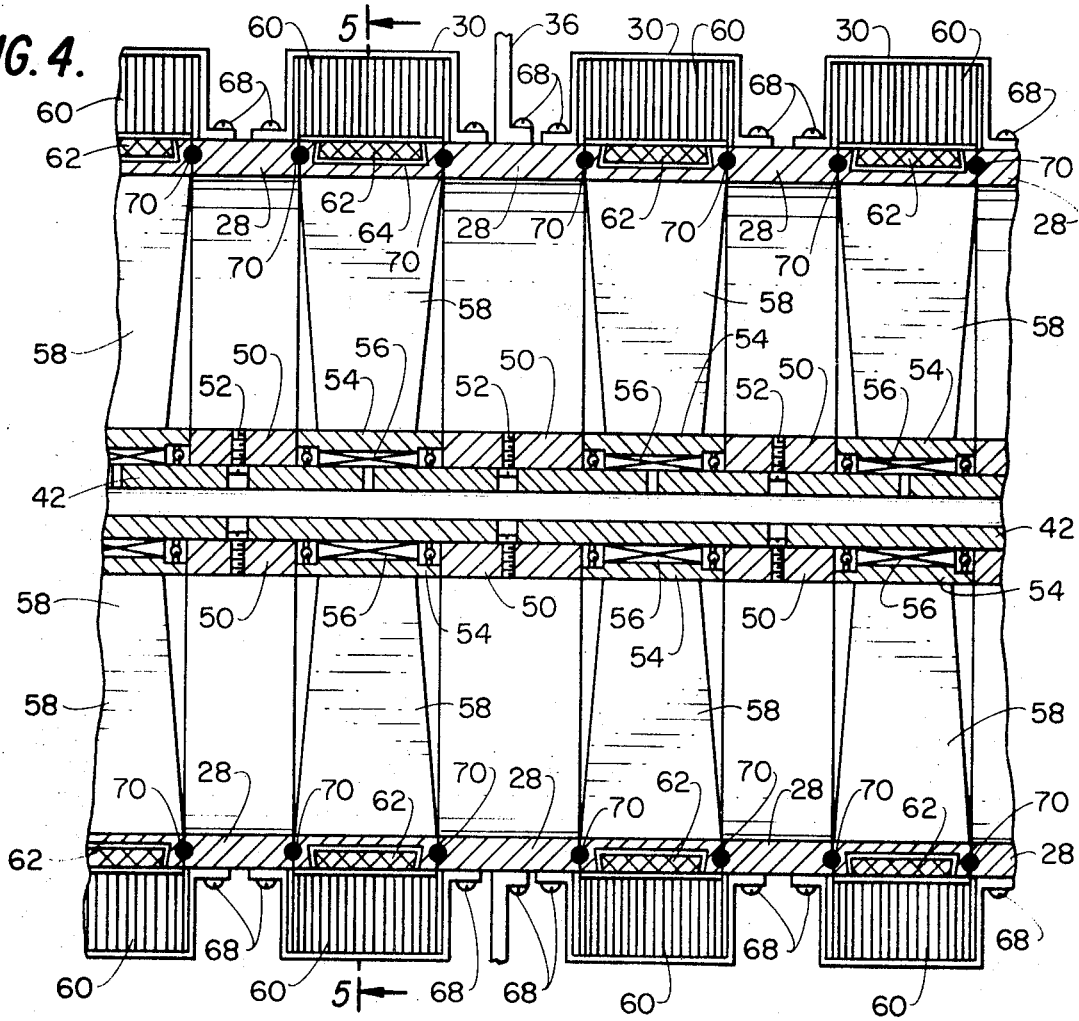
FIG. 4 is an enlarged section view illustrating portions of the stator-rotor arrangement in accordance with the principles of this invention.
Figure 5:
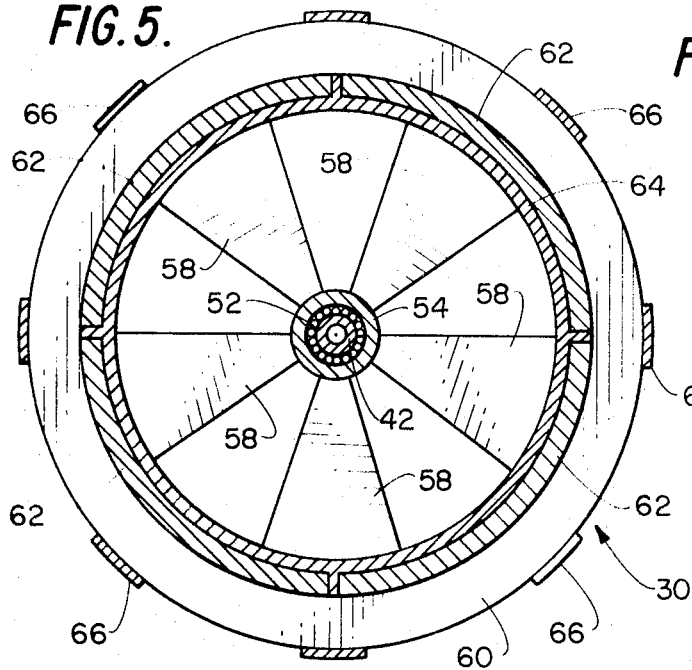
FIG. 5 is a section view taken along the lines 5—5 of FIG. 3 illustrating a rotor of the generator in accordance with the principles of this invention.

FIGS. 4 and 5 illustrate, in an enlarged section view, the construction and positioning of the rotors 30 and stators 28 in accordance with the principles of this invention. As previously mentioned, each stator 28 is affixed to the shaft 42. Specifically each stator 28 as shown in FIG. 5, comprises a hub 50 which is firmly affixed to the shaft 42 by a set screw 52. The rotors 28 include a hub 54 which is rotatably mounted to the shaft 42 by the bearings 56. Also a pair of bearings 57 are positioned between the hub 54 of the rotor 30 and the hub 50 of the stator 28. Each stator 28 and rotor 30 are independently mounted from one another whereby the rotors 30 are capable of rotating independent of the movement of other rotors in the system.

Each rotor 30 in the disclosed embodiment shows five vanes 46 equally spaced about the hub 54. As the vehicle 10 moves in the forward direction 18 and the air moves through the electrical generator 24 in the direction 20. The rotors 30 inside the generator 24 rotate. Each rotor is independent of adjacent rotors, but is actuated by air passing through rotors positioned upstream.

Disposed about the periphery of each rotor 30 is a stationary AC armature 60, each of which is in the form of a plurality of laminated rings to form the armature in a manner well known to those skilled in the art. The AC armature 60 is held into position by suitable mounting clips 66 disposed around the periphery of the rotor 30 and is attached to the stator 28 by suitable bolts 68.

Each rotor 30 has permanent magnetic segments 62, which are shown herein in at least four arcuate segments. In this embodiment, each segment 62 is provided with a steel backing ring 64 and which are embedded within a rim 64 disposed around the periphery of each of the vanes 46. The magnets 62 form the moving magnetic field which creates the electrical energy to be generated in the armature 60.

The stator 28 is separated from the rotor 30 by a small dimension and an air seal ring 70 is positioned between the stator and the rotor in a suitable manner to prevent air loss of the air within the generator 24 to increase the efficiency of this invention.

Oil holes 72 are provided leading from the hollow portion of shaft 42 into each bearing 56 so that if it is necessary to oil the bearings 56, all that need be required is that oil be placed into the hollow shaft 42 by removing the nut 48 therefrom, thereafter the oil from within the shaft will flow through holes 72 into the bearings 56.

Figure 6:
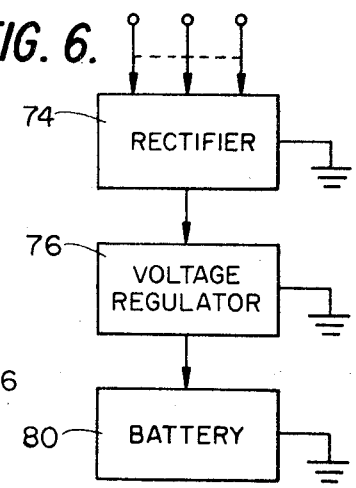
FIG. 6 is a block diagram of the circuitry used in connection with the present invention for battery charging purposes.

As air enters the air scoop 16 the air flow 20 starts each of the rotors 30 rotating in their appropriate direction. Each rotor rotates independently so that it is not dependent upon overload, such as the drag from a single shaft. Each one is easily started and not hampered by the drag and friction of the air flow therearound. As the rotors 30 rotate, electrical energy is created in the armatures 50 in the manner well known to those skilled in the art. Each armature is coupled into a rectifier 74, as shown in FIG. 6, where the voltage is rectified therein. The rectified voltage output of each armature is coupled together in a parallel, series, or series parallel configuration, whichever proves to be most efficient and thereafter to a voltage regulator to assure that the voltages are of the proper amplitude level before being applied to the battery 80.

While this invention, illustrated in the disclosed embodiment, only shows eight such rotors 30 in a single electrical generator 24, more rotors can be used and still remain within the spirit and scope of this invention.

Having thus described but one preferred embodiment of this invention, what is claimed is:

I claim:

1. In an air driven electrical generator for recharging batteries, said generator including:
   a stationary horizontally disposed shaft;
   a plurality of stator elements fixedly mounted to said shaft, each stator element of said plurality including a rim, a hub and webs supporting the rim to the hub, said rim, hub and webs defining a hollow area for the passage of an air stream therethrough;
   a plurality of rotor elements rotatably mounted to said shaft, to rotate independently from each other, each rotor of said plurality of rotors being interdisposed between alternate stators of said plurality of stators, each said rotor element of said plurality including a rim, a hub and vanes disposed between the hub and the rim;
   a plurality of arcuate magnetic segments disposed on the periphery of each rim on each rotor of said plurality; and
   a plurality of armature members, each armature for a corresponding one of said arcuate magnetic segments each armature being mounted to adjacent stators radially outward of the rim of corresponding rotors;
   whereby air passing through the stator webs causes the rotor vanes to rotate the magnetic segments past the stator armatures to generate electricity.

2. The electrical generator as defined in claim 1 wherein said generator further including rectifier means responsive to the electrical voltage provided by the armatures for providing an electrical recharge to the batteries.

* * * * *